Figure 1:
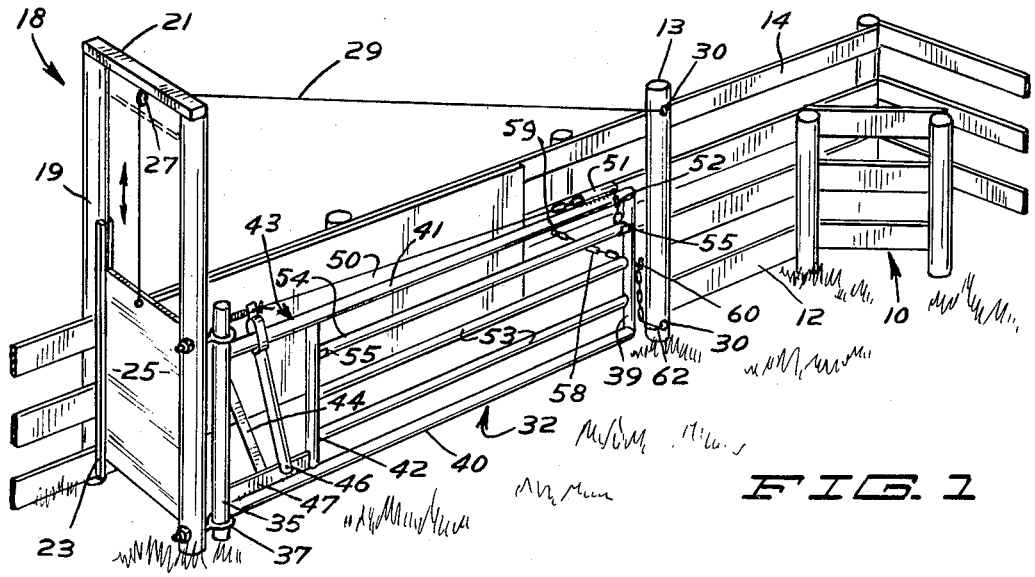

Nov. 30, 1965

R. A. TREFZ 3,220,384

AUTOMATICALLY RESTRAINING CATTLE GATE STANCHION

Filed April 24, 1964

3 Sheets-Sheet 1

INVENTOR.
ROBERT A. TREFZ
BY
ATTORNEYS

Nov. 30, 1965 R. A. TREFZ 3,220,384
AUTOMATICALLY RESTRAINING CATTLE GATE STANCHION
Filed April 24, 1964 3 Sheets-Sheet 2

INVENTOR.
ROBERT A. TREFZ
BY
Richard Gregory
ATTORNEYS

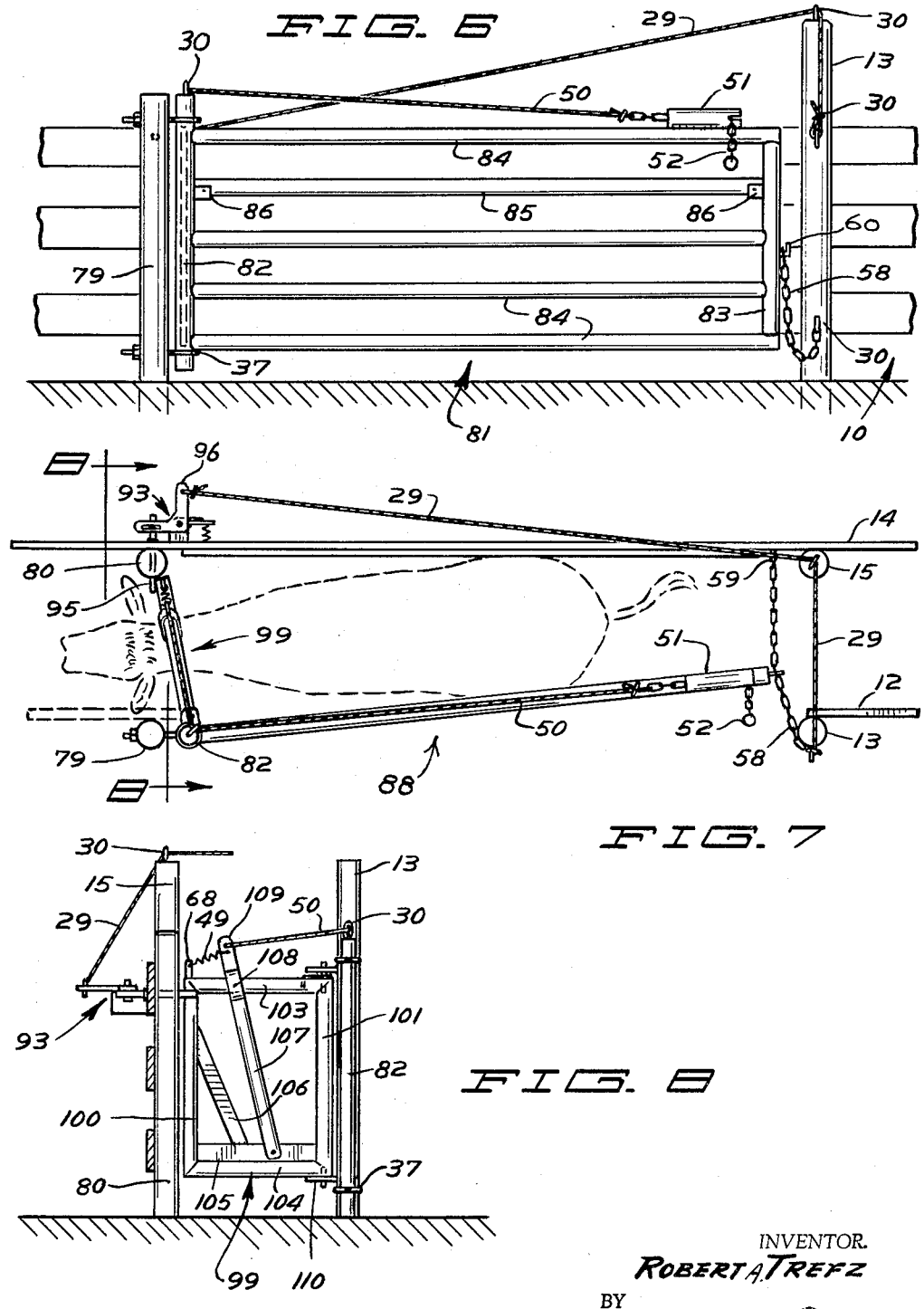

United States Patent Office 3,220,384
Patented Nov. 30, 1965

3,220,384
AUTOMATICALLY RESTRAINING CATTLE
GATE STANCHION
Robert A. Trefz, Tolstoy, S. Dak.
Filed Apr. 24, 1964, Ser. No. 362,436
3 Claims. (Cl. 119—99)

This invention relates to improvement in a cattle gate structure. More particularly, this invention relates to a cattle gate structure as used in connection with a runway. It is desirable to have such a structure in connection with a runway particularly adapted to conveniently hold still or immobilize an animal for the purpose of treating the animal, such as for inoculating or branding it, or for other purposes requiring the animal to be held in a stationary position.

It is an object of this invention therefore to provide a cattle gate structure being arranged and constructed to hold the head of an animal and to provide for a swinging movement of the gate to pin or immobilize the body of an animal as against an adjacent structure.

It is another object of this invention to provide a cattle gate structure in connection with a runway, said gate being arranged and constructed to hold the head of an animal and with forward movement of the animal causing said gate to pivot in a direction against its body to assist in immobilizing its body with self-imposed pressure as against an adjacent fence portion of the runway.

It is also an object of this invention to provide a cattle gate structure arranged and constructed to form an end gate of a runway to hold the head of an animal and to provide a side gate integral with said end gate to immobilize the body of the animal in connection with a fence portion of said runway.

Figure 2:
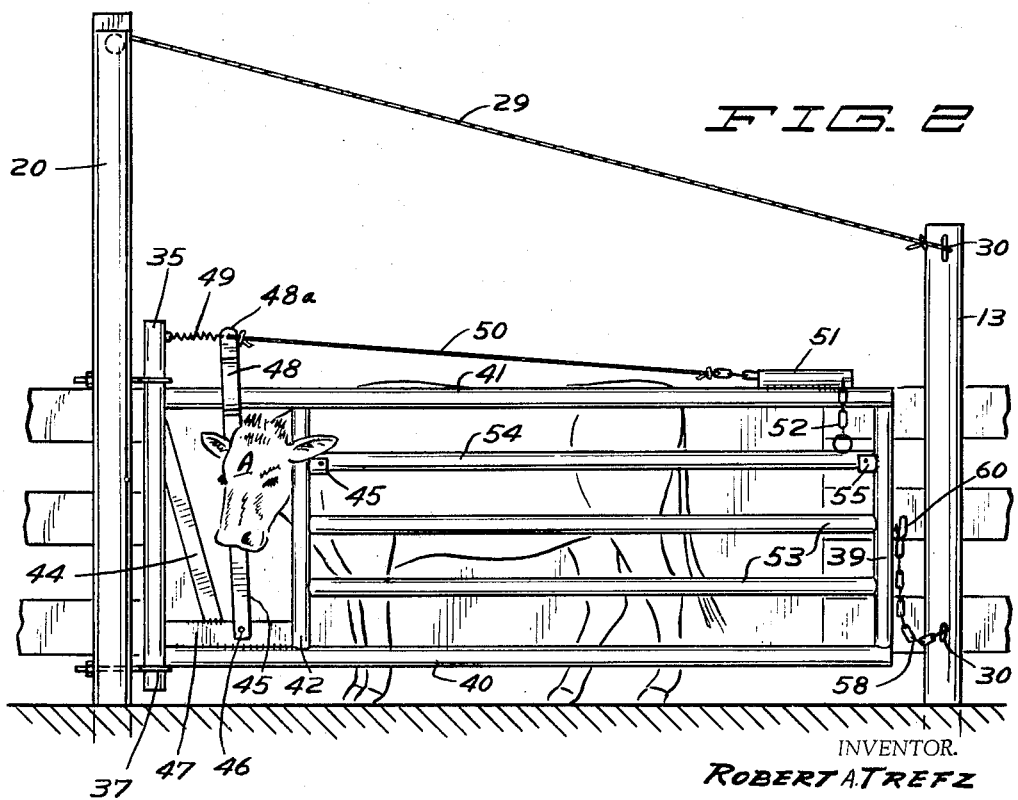
Figure 3:
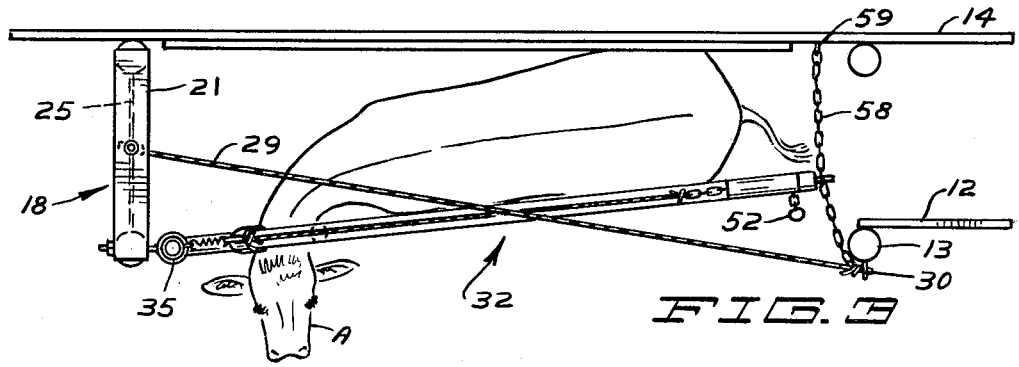
Figure 4:
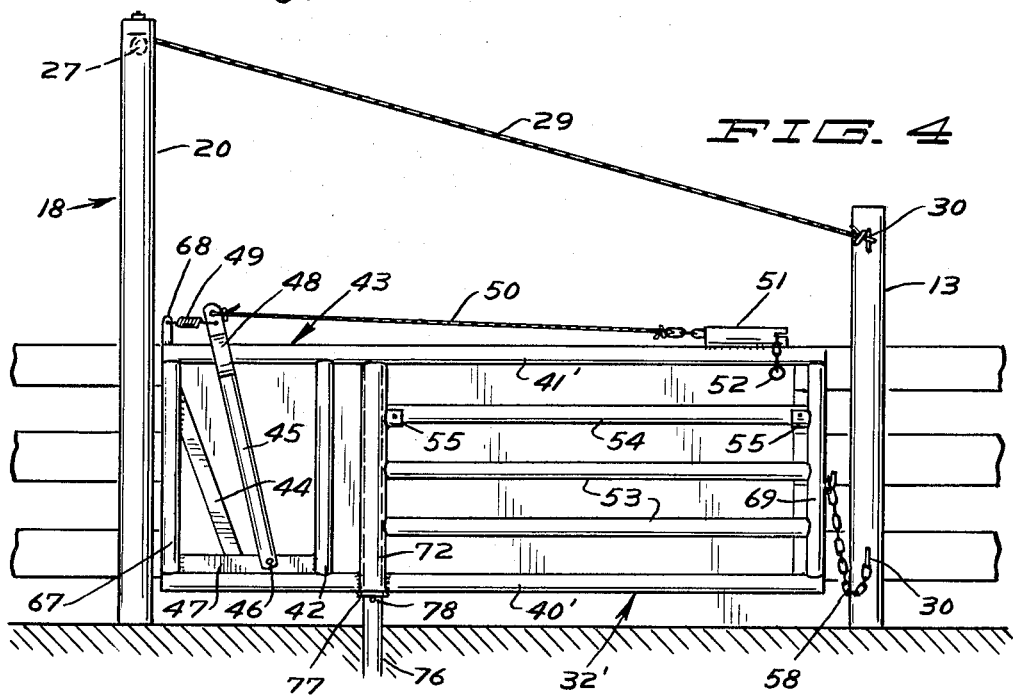
Figure 5:
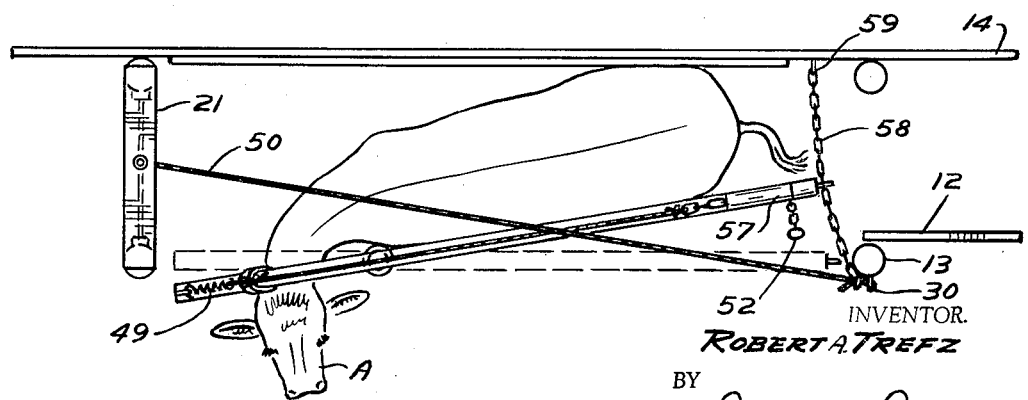

These and other objects and advantages of the invention will be fully set forth in the following description made in connection with the accompanying drawings in which like reference characters refer to similar parts throughout the several views and in which:

FIG. 1 is a perspective view showing the invention herein in operating position;
FIG. 2 is a broken view in front elevation;
FIG. 3 is a top plan view;
FIG. 4 is a broken view in front elevation showing a modification;
FIG. 5 is a top plan of the view shown in FIG. 4;
FIG. 6 is a broken view in front elevation of another modification of the invention herein;
FIG. 7 is a top plan of the view in FIG. 6; and
FIG. 8 is a view in vertical section taken on line 8—8 of FIG. 7.

Referring to the drawings and in particular to FIGS. 1–3, a runway 10 of conventional design, as for cattle, is shown, with only sufficient of this structure being shown to support the disclosure of the invention herein. Said runway is shown comprising substantially parallel fences 12 and 14 supported by a plurality of suitable posts including a terminal post 13 of the fence 12. The fence 14 has a solid cover portion 16 overlying its terminal portion opposite the gate 32 to be described hereinafter. At the outlet of said runway is a frame structure 18 comprising upstanding posts 19 and 20 having an overhead cross member 21.

Spaced vertically disposed molding strips 23 are secured to the facing sides of the lower portions of said posts 19 and 20 forming opposed vertical slots to receive an end gate 25 therein. Said cross member 21 carries a pulley 27 over which passes a cable 29 running from said end gate to a holding member 30 shown as an eyebolt secured to the post 13. Thus said end gate is raised manually by the operator merely reaching overhead and pulling down on said cable.

The invention herein relates particularly to the side gate structure which is indicated generally by the reference character 32. Said side gate structure in being disposed or located between the posts 20 and 13 in effect forms a terminal portion of the fence 12.

Posts 35 and 39 respectively form the rearward and forward end posts of said gate structure 32. Said gate structure as a whole is supported by the post 20. Conventional strap hinges 37 are secured about upper and lower portions of the post 35 and have threaded bolt-like portions disposed through the post 20 to be secured as by appropriate nuts, as illustrated. Extending between said posts 35 and 39 are horizontal bottom and top bars 40 and 41.

Spaced inwardly of said post 35 and disposed between said bottom and top bars is a vertical post 42. Secured between said bars 42 and 39 are a pair of spaced horizontal bars 53 with a third horizontal bar 54 being removably supported by U-shaped hangers or brackets 55 respectively secured to said posts 42 and 39.

Secured between the posts 35 and 42 and overlying the adjacent portion of the bottom bar 40 is a plate member 47 upstanding on a side edge portion. Angled between said plate member 47 and said post 35 is a slat 44. Pivoted to said plate member 47 and upstanding therefrom is a swingable slat or bar member 45 having a collar-like upper end portion 48 disposed about the adjacent upper portion of said bar 41 and having upstanding therefrom a small apertured lug portion 48a. Said member 45 has a split or bifurcated lower end portion disposed over said plate member 47 and pivoted thereto by a pin 46 as illustrated. Thus there is formed a stanchion indicated generally by the character 43.

A coil spring 49 is shown running from the post 35 to said apertured lug portion 48a to urge the same in the direction of said post. A cable 50 runs from said apertured lug portion 48a having a free end portion 52 in the form of a chain having relatively large links. Said chain portion passes through a sleeve-like or tubular member 51 which is secured to the upper surface of the forward end portion of the upper bar 41. The forward end of said member 51 is slotted to removably engage and hold fast said chain portion.

A locking means for the gate structure 32 is provided in the form of a chain 58 comprised of links of sufficient size to be disposed oevr the L-shaped finger type of bracket 60 secured to the outer side of the post 39, as illustrated in FIG. 2. One end of said chain will be secured to the fence 14, as by an eyebolt 59, as shown in FIG. 3. The other end of said chain may be secured to the eyebolt 30 as shown at the foot of the post 13.

The reference character A is used to indicate an animal generally, with the animal being shown for the purpose of illustration.

It will be understood that the above described gate structure 32 may be formed of various materials, but has been found to be suitably formed of metal members readily welded together to form an integral or unitary operating unit.

*Operation*

The invention herein provides means whereby a single person can easily and efficiently hold still or immobilize an animal, such as for the purpose of treating the animal.

The animal will be driven through the runway 10. The side gate structure 32 forms a terminal portion of the fence 12 at one side of the runway. The animal's head will be disposed through the stanchion 43. The movable bar 45 normally urged to an open position will be swung by a pull on the chain 52 to engage the animal's head to hold fast said head within the stanchion. Where only one person is present, he may of course grasp the cable adjacent the stanchion to secure a hold on the animal and work his way along the cable to the chain portion thereof, drawing the chain through the sleeve 51 and locking the chain in the slotted end of the sleeve.

Next, the forward end portion of the gate structure 32 will be pushed against the animal in the direction of the fence 14 to move the animal's body thereagainst to the point that the animal's body is wedged and held snugly, as indicated in FIG. 3. The chain 58 is then positioned relative to the bracket 60 to hold the gate structure 32 fixed in such position. Thus with the head of the animal being held in the stanchion restricting backward and forward movement of the animal and with the angled gate structure wedging the animal snugly against the adjacent portion of the fence 14 to prevent side movement of the animal, the animal is effectively immobilized and held securely in a relatively stationary position.

For ready and convenient access to the animal, the horizontal bar 54 is lifted out of the brackets 55 and removed. Thus adequate space is provided through which the animal can be easily reached.

When the animal has been treated and is ready to be released, the operator pulls down on the overhead portion of the cable 29 to raise the end gate 25, and the chain 52 is disengaged from the slotted portion of the sleeve 51 to release the bar 45 to open up the stanchion 43. The chain 58 is disengaged from the finger bracket 60 and the animal is fully released. The animal removes its head from the stanchion and is free to move out of the runway.

Modification

With reference to FIGS. 4 and 5, a modification of the invention herein is shown.

The runway structure generally is as above described with identical reference characters indicating like parts.

The gate structure 32' is substantially the same as the gate structure above described with one specific element of difference. The gate structure 32 was supported at its rearward end portion at the outer side of the stanchion portion thereof. The gate structure 32' is pivoted at a point intermediate the ends thereof somewhat inwardly of the stanchion portion.

Said gate structure 32' comprises end posts 67 and 69 having bottom and top horizontal connecting bars 40' and 41'. Formed at the rearward end portion of said gate structure 32' is a stanchion 43 identical to that above described in connection with the gate structure 32. Said post has an upstanding apertured finger portions 68 securing one end of the coil spring 49.

Positioned intermediate the ends of said gate structure 32' and adjacent said stanchion is a post 72 tubular in form with an open bottom and integral with the horizontal bars 40' and 41'. Said post 72 is arranged and constructed to be disposed over a supporting post 76 upstanding from a firm anchorage in the ground. Said post 72 is supported on a collar 77 held by a pin 78 disposed through said post 76. Thus said gate structure 32' is pivotally mounted on said post 76.

The remainder of the gate structure 32' with its related parts is identical with the structure of gate 32 above described and as shown in FIGS. 1–3.

Operation

It is seen that the gate structure 32' pivots at a point adjacent the inner side of the stanchion 43.

Thus with the animal positioned, as indicated in FIG. 5, the animal's head portion is at one side of the pivot point of the gate structure and the body portion of the animal for the most part is at the opposite side of said pivot point. As the animal urges its head forwardly through the stanchion it exerts leverage on the gate structure causing the gate to swing against its own body portion. Thus the animal assists the operator in swinging the gate structure 32' to pin and immobilize its own body portion against the opposite portion of the fence 14. The runway itself will be of sufficiently narrow width that the animal will not be able to turn around therein and in having its body portion pinned or wedged between the gate structure and the opposing fence structure, the animal will be effectively immobilized.

Modification

Reference is now had to the embodiment of the invention as shown in FIGS. 6–8. The modification herein provides both a side gate and an end gate as an integral operation unit in connection with a runway.

The runway is substantially the same as above described but in lieu of the outlet frame structure 18 there are a pair of end posts 79 and 80 with respect to the fences 12 and 14.

The gate structure herein indicated generally by the character 88 comprises a side gate indicated generally by the character 81 and an end gate embodying a stanchion and being indicated generally by the character 99. Said gate structure is preferably formed of metal members which are readily secured together, as by welding.

Said side gate 81 comprises end posts 82 and 83 with horizontal bars 84 extending therebetween and with the horizontal bar adjacent the top bar indicated by the character 85 being removably supported on the brackets 86. Said post 82 extends somewhat above and below the top and bottom horizonal bars and has adjacent either end thereof hinges 37 as above described which are secured in a conventional manner to the end post 79.

The chain 58 used for locking the forward or free swinging end of said side gate 81 is the same as above described, being secured at one end to the fence 14 by eyebolt 59 and being secured at its other free end to the eyebolt 30 at the foot of the post 13. Said chain engages the bracket 60 carried at the end of said side gate as illustrated. As previously noted with respect to the above species of the invention herein, said side gate 81 forms a terminal portion of the fence 12 in being disposed between the posts 13 and 79.

Disposed substantially at right angles to said side gate 81 and hinged to said post 82 is the end gate 99. Said end gate is substantially frame-like in form having side members 100 and 101, a top cross member 103 and a bottom cross member 104. A plate member 105 standing on end overlies said bottom member 104. Angled between said plate member 105 and the side member 100 is a bar 106. Pivoted to said plate member 105 is a movable bar member 107 identical in construction to the member 45 above described having a collar portion 108 slidingly disposed about the top member 103 and having an apertured upstanding lug portion 109.

Said side member 100 has a small lug or finger-like member 68 upstanding therefrom with a coil spring 49 running therefrom to engage the lug portion 109 and thus normally urge the member 107 to open position in a direction to move it away from the side member 101. Secured to said lug portion 109 is the cable 50 previously described running through the eyebolt or guide 30 on post 82 and through the sleeve 51 carried on the gate 81. This is identical to like structure above described.

Conventional spring loaded hinges 110 swingably support said gate 99 on said post 82. Said hinges are adapted to permit said gate to swing outwardly only. A gate latch 93 of conventional design is mounted on the post 80 having a spring loaded latching member 95 extending through said post to retain said gate from swinging outwardly. Said latching member is actuated by an arm portion 96 from which a cable 29 runs through guides or eyebolts 30 in the posts 15 and 13 to have its free end secured to the eyebolt 30 mounted on a lower side portion of the post 13.

Operation

This second modification of the invention herein provides both a side gate and an end gate as an integral installation in connection with a runway.

The animal is brought into the runway and will have its head positioned in the stanchion formed within the gate 99. The cable 50 will be pulled to move the member 107 to lock the head of the animal within the stanchion and said cable will be secured, as illustrated, at the slotted end of the sleeve-like member 51.

The side gate 81 will next be moved in the direction of the fence 14 to pin the animal therebetween in a wedge-like manner. Thus the animal is effectively immobilized. The chain 58 is pulled up tight to lockingly engage the bracket 60 to hold the gate in fixed position. The horizontal member 85 is removed by being lifted out of the brackets 86. Thus space is provided for the operator to conveniently reach the animal.

When the animal has been treated, the cable 50 will be released to open the stanchion in the end gate and the overhead cable 29 will be pulled downwardly to release the latching member 95 from the gate and the animal will open the gate in leaving the runway. Said spring loaded hinges 110 will return the gate to its normally closed position. The chain 58 will be loosened from the bracket 60 to move the gate 81 outwardly into alignment with the fence 12.

Thus it is seen that I have provided a simple construction which permits one person to readily and effectively handle animals, such as cattle, to hold the animals immobilized for purpose of treatment. This invention has proved to be very successful in use.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A cattle gate structure in connection with a runway comprising a fence having in combination, a gate being vertically disposed and substantially rectangular in form, one portion of said gate forming a stanchion, means pivotally supporting said gate at a point intermediate the ends thereof, and said pivot means being positioned on said gate relative to said stanchion to have said gate swing to an animal holding wedging position responsive to pressure of an animal against said stanchion.

2. A cattle gate structure in connection with a runway comprising a pair of parallel fences having in combination, a gate being arranged and constructed to form a portion of one of said fences, a stanchion embodied within said gate, means intermediate the ends of said gate pivotally supporting said gate, said means being arranged relative to said gate to have said gate swing to wedge an animal against the other of said fences responsive to pressure of an animal against said stanchion, and means locking said gate in said last mentioned position.

3. A cattle gate structure in connection with a runway comprising a pair of parallel fences having in combination, a gate forming a side portion of one of said fences, a stanchion in operative association with said gate, and a member disposed between and pivotally supporting said stanchion and said gate.

References Cited by the Examiner
UNITED STATES PATENTS

| | | | |
|---|---|---|---|
| 193,307 | 7/1877 | Winchell | 119—99 |
| 629,675 | 7/1899 | Fox | 119—99 |
| 902,638 | 11/1908 | Allison | 119—99 |
| 2,692,577 | 10/1954 | Thomas | 119—99 |
| 2,773,476 | 12/1956 | Thomas | 119—99 |
| 2,787,982 | 4/1957 | Cederberg | 119—98 |
| 2,861,546 | 11/1958 | Stroup | 119—98 |
| 3,152,577 | 10/1964 | Sheriff | 119—99 |

MELVIN D. REIN, *Primary Examiner.*

ALDRICH F. MEDBERY, *Examiner.*